(12) United States Patent
Stovall et al.

(10) Patent No.: US 10,798,866 B2
(45) Date of Patent: Oct. 13, 2020

(54) DEPTH CONTROL SYSTEM FOR RAISING AND LOWERING A WORK UNIT OF AN IMPLEMENT

(71) Applicant: CNH Industrial America LLC, New Holland, PA (US)

(72) Inventors: Christopher Stovall, Chicago, IL (US); Duqiang Wu, Bolingbrook, IL (US); Navneet Gulati, Naperville, IL (US); Michael Glennon, Normal, IL (US)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 16/100,803

(22) Filed: Aug. 10, 2018

(65) Prior Publication Data

US 2020/0045870 A1 Feb. 13, 2020

(51) Int. Cl.
    *A01B 63/32* (2006.01)
    *A01C 7/20* (2006.01)
    *A01B 63/00* (2006.01)

(52) U.S. Cl.
    CPC ............ *A01B 63/32* (2013.01); *A01B 63/008* (2013.01); *A01C 7/203* (2013.01); *A01C 7/205* (2013.01)

(58) Field of Classification Search
    CPC ....... A01B 63/32; A01B 63/008; A01C 7/203; A01C 7/205; F16K 31/1245; F16K 31/42
    See application file for complete search history.

(56) References Cited

U.S. PATENT DOCUMENTS

| | | |
|---|---|---|
| 4,799,851 A | 1/1989 | Swanson |
| 5,148,676 A | 9/1992 | Moriya et al. |
| 5,211,196 A | 5/1993 | Schwelm |
| 5,415,076 A | 5/1995 | Krone et al. |
| 5,852,934 A | 12/1998 | Chung et al. |
| 6,092,454 A | 7/2000 | Vande Kerckhove |
| 6,164,415 A | 12/2000 | Takeuchi et al. |
| 6,435,310 B1 | 8/2002 | Choi |
| 6,467,264 B1 | 10/2002 | Stephenson et al. |
| 6,598,391 B2 | 7/2003 | Lunzman et al. |

(Continued)

OTHER PUBLICATIONS

Bucher Hydraulics; Stroking Cyclinders out/in at the Same Time Without Oscillations; Bucher Hydraulics AG Frutigen 400-FL-000100-EN-00 / Sep. 2015—(2) pages.

*Primary Examiner* — Jessica Cahill
*Assistant Examiner* — Patrick C Williams
(74) *Attorney, Agent, or Firm* — Rebecca L. Henkel; Rickard K. DeMille

(57) ABSTRACT

The present inventors have recognized that hydraulic cylinders for raising and lowering "work units" of an agricultural implement used for engaging the ground can be improved by replacing one or more electronically controlled (electrohydraulic) proportional valves associated with a rod port of the cylinder with a simplified, flow control device, such as a pressure regulator, while still using the electronically controlled proportional valves associated with a base port of the cylinder. Due to the weight of the implement being associated with the rod side, which tends to force retraction of the rod when not opposed by the base side, complex proportional valves associated with the rod side can be replaced with such simplified devices providing a relatively low pressure sufficient to move hydraulic fluid with respect to the rod side.

16 Claims, 5 Drawing Sheets

(56) References Cited

U.S. PATENT DOCUMENTS

| | | | |
|---|---|---|---|
| 6,851,377 B2 | 2/2005 | Mayerle et al. | |
| 7,028,599 B2 | 4/2006 | Linser | |
| 7,401,542 B2 | 7/2008 | Stephens et al. | |
| 7,472,638 B2 | 1/2009 | Hajek, Jr. et al. | |
| 7,513,521 B2 * | 4/2009 | Posselius | A01B 61/02 280/463 |
| 7,827,787 B2 | 11/2010 | Cherney et al. | |
| 8,235,130 B2 * | 8/2012 | Henry | A01B 63/22 172/239 |
| 8,375,989 B2 * | 2/2013 | Schottler | F15B 11/044 137/596.18 |
| 8,800,426 B2 | 8/2014 | Andersson | |
| 9,162,297 B2 | 10/2015 | Luyendijk | |
| 9,187,297 B2 | 11/2015 | Sugano et al. | |
| 9,226,438 B2 | 1/2016 | Faivre | |
| 9,615,499 B2 | 4/2017 | Kowalchuk et al. | |
| 9,650,760 B2 | 5/2017 | Sakon | |
| 2007/0130933 A1 * | 6/2007 | Yoshino | F15B 11/006 60/469 |
| 2013/0160874 A1 * | 6/2013 | Nomichi | F02M 21/0239 137/511 |
| 2015/0053442 A1 | 2/2015 | Kovach et al. | |
| 2018/0058043 A1 | 3/2018 | Beckhusen | |

* cited by examiner

DEPTH CONTROL SYSTEM FOR RAISING AND LOWERING A WORK UNIT OF AN IMPLEMENT

FIELD OF THE INVENTION

The present invention relates generally to agricultural systems having work units for engaging the ground, and more particularly, to hydraulic cylinders configured to raise and lower such work units in which a pressure regulator is arranged between a pump and a rod port of the cylinder to regulate hydraulic fluid to the rod port at a constant pressure while electronically controlled proportional valves are arranged with respect to the base port of the cylinder for metering hydraulic fluid for raising or lowering.

BACKGROUND OF THE INVENTION

An agricultural implement is generally composed of a number of work units, such as seed or fertilizer dispensers, or soil preparation tools, e.g., discs, tillers, cultivators, plows, and the like, that are typically carried by an implement frame that is hitched to and towed by a tractor, combine or similar wheeled device. For many agricultural implements, such work units can be raised or lowered via one or more hydraulic cylinders in order to affect different depth engagements with respect to the ground. The hydraulic cylinders are in some cases controlled electronically by proportional valves associated with the base and rod ports of the cylinder, each being precisely controlled to meter hydraulic fluid to or from the cylinder at times, in a coordinated manner, to effect raising or lowering of the work unit. However, electronically controlled proportional valves are expensive and require complex logic to coordinate. It is therefore desirable to produce a system for controlling the depth engagement of work units that is less expensive, more efficient and/or less complex.

SUMMARY OF THE INVENTION

The present inventors have recognized that hydraulic cylinders for raising and lowering "work units" of an agricultural implement used for engaging the ground can be improved by replacing one or more electronically controlled (electrohydraulic) proportional valves associated with a rod port of the cylinder with a simplified, flow control device, such as a pressure regulator, while still using the electronically controlled proportional valves associated with a base port of the cylinder. Due to the weight of the implement being associated with the rod side, which tends to force retraction of the rod when not opposed by the base side, complex proportional valves associated with the rod side can be replaced with such simplified devices providing a relatively low pressure sufficient to move hydraulic fluid with respect to the rod side.

Specifically then, one aspect of the present invention can provide a system for raising and lowering a work unit of an agricultural implement, including: a pump configured to supply hydraulic fluid; a hydraulic cylinder having a base, a base port, a rod and a rod port, in which the rod is configured to extend from the base when hydraulic fluid is supplied to the base port and withdrawn from the rod port, and wherein the rod is configured to retract toward the base when hydraulic fluid is supplied to the rod port and withdrawn from the base port; a first electronically controlled proportional valve arranged between the pump and the base port of the hydraulic cylinder, in which the first electronically controlled proportional valve is selectively controlled to proportionally meter hydraulic fluid from the pump to the base port; a second electronically controlled proportional valve arranged between the base port of the hydraulic cylinder and a reservoir, in which the second electronically controlled proportional valve is selectively controlled to proportionally meter hydraulic fluid from the base port to a reservoir; and a pressure regulator arranged between the pump and the rod port of the hydraulic cylinder, in which the pressure regulator is configured to regulate the hydraulic fluid to the rod port at a constant pressure.

Another aspect of the present invention can provide an agricultural system including: an agricultural implement having a work unit; a hydraulic cylinder configured to raise and lower the work unit, the hydraulic cylinder having a base, a base port, a rod and a rod port, in which the rod is configured to extend from the base when hydraulic fluid is supplied to the base port and withdrawn from the rod port, and in which the rod is configured to retract toward the base when hydraulic fluid is supplied to the rod port and withdrawn from the base port; a pump configured to supply hydraulic fluid; a first electronically controlled proportional valve arranged between the pump and the base port of the hydraulic cylinder, in which the first electronically controlled proportional valve is selectively controlled to proportionally meter hydraulic fluid from the pump to the base port; a second electronically controlled proportional valve arranged between the base port of the hydraulic cylinder and a reservoir, in which the second electronically controlled proportional valve is selectively controlled to proportionally meter hydraulic fluid from the base port to a reservoir; and a pressure regulator arranged between the pump and the rod port of the hydraulic cylinder, in which the pressure regulator is configured to regulate the hydraulic fluid to the rod port at a constant pressure.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
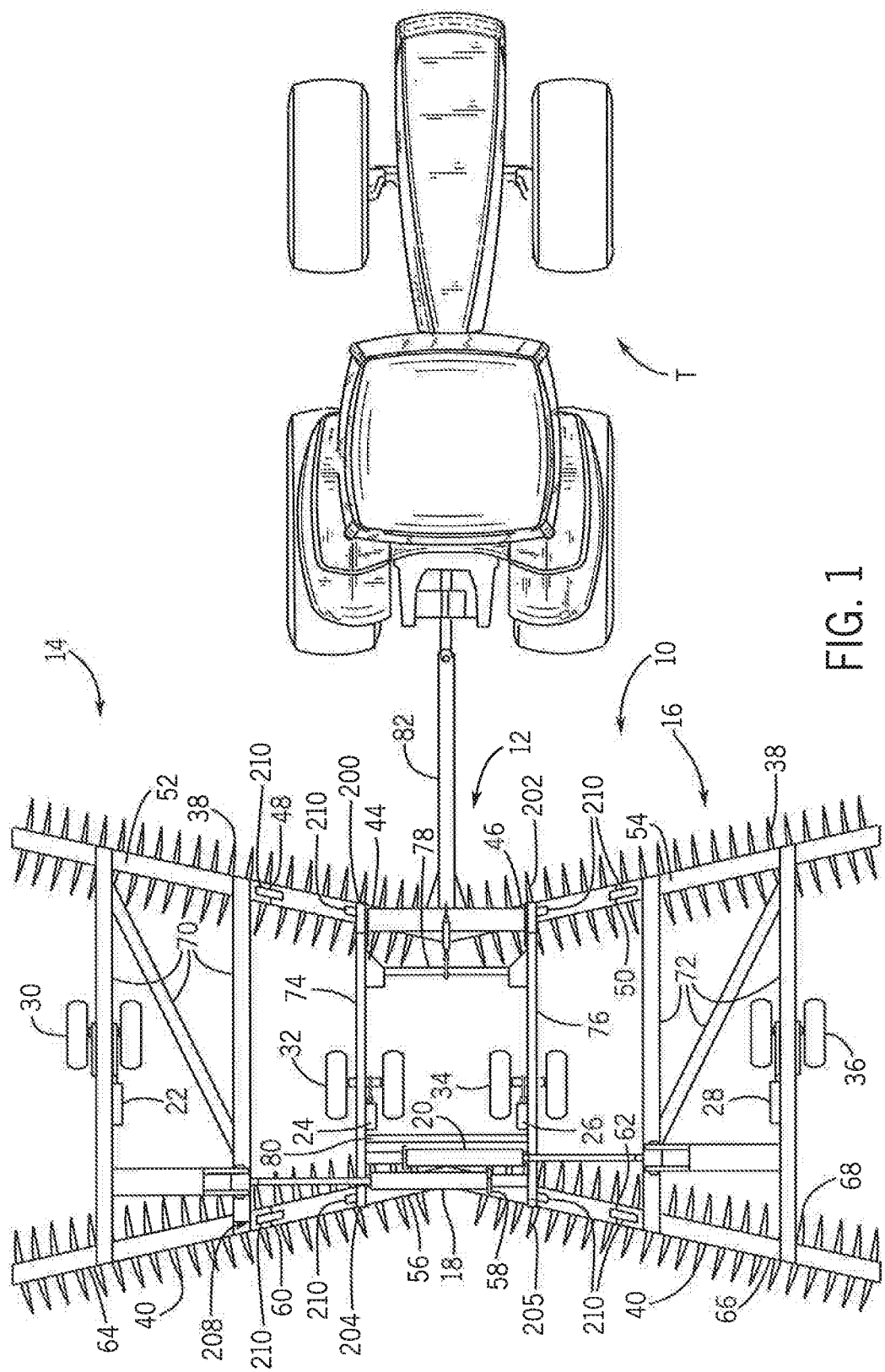
FIG. 1 is a top view of an exemplar agricultural machine and an exemplar agricultural implement hitched to the agricultural machine and having a depth control system according to an aspect of the present invention.

Referring now to the drawings and specifically to FIG. 1, an implement 10 is shown by way of example. Exemplar implements could be, for example, a Tiger-Mate 255 Field Cultivator, a True-Tandem 335 Barracuda vertical tillage tool, or an Ecolo-Tiger 875 disk ripper, each available from CNH Industrial. The implement 10, as illustrated, may include a central frame 12, wings 14 and 16 pivotally coupled to the frame 12, lift actuators 18 and 20 for lifting the wings 14 and 16 above the frame 12, wheel actuators 22, 24, 26 and 28 pivotally connected between the frame 12 and the wings 14, 16, and wheel sets 30, 32, 34 and 36 for raising and lowering wheel sets 30, 32, 34 and 36, front tool gang 38 fixed to the front of the frame and wings, rear tool gang 40 fixed to the rear of the frame 12 and wings 14, 16, each of which comprise movable components or work units of the implement 10.

Front tool gang 38 can include inner forward gang tubes 44 and 46 which are connected to the central frame 12 via pivotal couplings 200, 202 and extend laterally away from the central frame 12. These gang tubes 44, 46 also have pivotal couplings 48 and 50 disposed at their outer ends to which outer forward gang tubes 52, 54, respectively, are pivotally connected. Rear tool gang 40 includes inner rear gang tubes 56 and 58 which are connected to central frame 12 via pivotal couplings 204, 205 and extend laterally away from the central frame 12. These gang tubes 56, 58 also have pivotal couplings 60 and 62 disposed at their outer ends to which outer rearward gang tubes 64 and 66, respectively, are pivotally connected. A plurality of ground engaging tools such as planters, seeders, fertilizers, soil preparation devices, among others, and here shown as discs 68, are fixed to and disposed below each of the gang tubes 44, 46, 52-58, 64 and 66. Like each pair of inner and outer gang tubes themselves, these discs 68 can be arranged in a substantially straight line. The gang tubes 44, 46, 56, 58 on each side of the implement 10 are each bolted to a wing frame 70, 72 on that side of the implement 10 to provide structural support for the respective sides of the implement 10. In particular, outer gang tubes 52 and 64 are coupled to wing frame 70, and outer gang tubes 54 and 66 are coupled to wing frame 72.

The outer gang tubes 52, 54, 64, 66 can be pivotally coupled to the inner gang tubes 44, 46, 56, 58 to permit them to be lifted above and over the central frame 12 to permit the implement to be folded up for clearance when towed over the road. This lifting is provided by lift actuators 18 and 20, here shown as hydraulic cylinders. Lift actuator 18 is coupled between central frame 12 and wing frame 70 to lift wing 14, and lift actuator 20 is coupled between central frame 12 and wing frame 72 to lift wing 16. When lift actuators 18 and 20 are retracted, they pull their associated wings 14 and 16 upward and over the top of central frame 12 about pivotal couplings 48, 60, and 50, 62, respectively.

Wing 14 can include wing frame 70, front and rear gang tubes 52 and 64, respectively, and the ground engaging tools attached to those tubes. Wing 16 can include wing frame 72, front and rear gang tubes 54 and 66, and the ground engaging tools attached to those tubes. The central frame 12 can include two fore-and-aft extending members 74 and 76 to which wheel sets 32 and 34, respectively, are pivotally mounted. Side-to-side members 78 and 80 can be disposed at the front and rear, respectively, of the frame and can be coupled to members 74 and 76 to form a substantially rectangular framework. A tongue 82 can be coupled to the central frame 12 to allow the implement to be hitched to a tractor (identified by "T") in a known manner.

At each of the pivotal couplings connected to the various gang tube sections 44, 46, 52-58, 64 and 66 and the wheel sets 30-36 can be disposed actuators 24, 26, 208. The actuators 24, 26, 208 can be double acting, single ended hydraulic cylinders 210, with each of the cylinders including an integrated linear position sensor, such as those described in U.S. Pat. Nos. 7,307,418, 7,259,553, and 7,034,527, the disclosures of which are incorporated herein by reference. Each cylinder 210 can control a work unit of the implement 10 and can be connected between the adjacent pivoting gang tube sections 44, 46, 52-58, 64 and 66 and/or the wheel sets 30-36 and the frame 12 in a manner such that the cylinders 210 can control the movement, and thus the height of the respective sections or work units defined by the pivotal couplings relative to one another. Exemplar work units for implements could include, for example, seed or fertilizer dispensers, soil preparation tools, e.g., discs, tillers, cultivators, plows, and the like.

Figure 2:
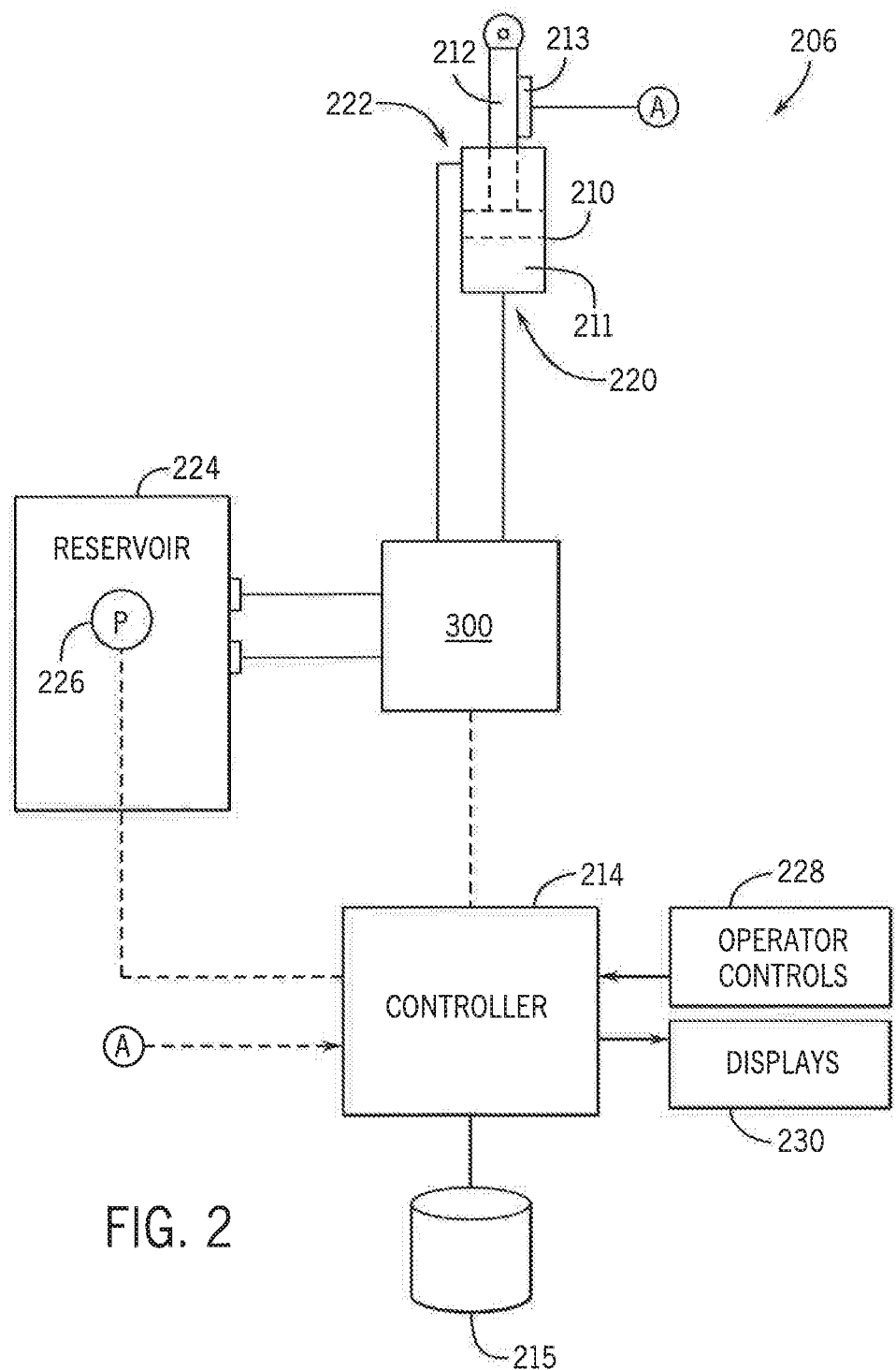
FIG. 2 is a schematic diagram of a depth control system according to an aspect of the present invention.

A depth control system 206, located on the implement 10 and tractor T, is schematically illustrated in FIG. 2 showing controls for the flow of hydraulic fluid to and from each of the hydraulic cylinders 210. A movable "piston" or rod 212 is extendable and retractable from a "cap" or base 211 of the cylinder 210, as fluidly controlled by a valve control system 300. A sensor 213, such as a linear potentiometer, integrated with respect to the hydraulic cylinders 210, can provide a signal to a controller 214 of the tractor T indicating a linear displacement of the hydraulic cylinder, reflected by an amount of extension or retraction of the rod 212. The controller 214 can selectively energize one or more solenoids of the valve control system 300 operably connected to the cylinder 210. The solenoids are fluidly connected to a fluid reservoir 224 or tank that includes a pump 226 configured to supply hydraulic fluid from the fluid reservoir 224. The pump 226 could supply hydraulic fluid at a pressure, for example, of at least 3000 psi (pounds per square inch). To extend the rod 212, hydraulic fluid can be supplied to the cylinder 210 through a base port 220, while hydraulic fluid is also withdrawn from the cylinder 210 through a rod port 222, as controlled by the valve control system 300 and the controller 214. Also, to retract the rod 212, hydraulic fluid can be supplied to the cylinder 210 through the rod port 222, while hydraulic fluid is also withdrawn from the cylinder 210 through the base port 220, as controlled by the valve control system 300 and the controller 214.

Depending on the position of the cylinder 210 and the rod 212, the valve control system 300 can affect a lifting or lowering of aspects of the implement 10 for depth control. For example, in one aspect, to raise outer gang tube 52 relative to gang tube 44 about the pivotal coupling 48, if the rod 212 is connected to the outer gang tube 52, retracting the rod 212 can cause raising of the outer gang tube 52 about the pivotal coupling 48, while extending the rod 212 can cause lowering of the outer gang tube 52. Conversely, in an exemplary aspect of the connection of the cylinder 210 and rod 212 between frame 12 and wheel set 36, retracting the rod 212 can cause the frame 12 to lower relative to the wheel set 36, while extending the rod 212 can cause the frame 12 to raise.

The controller 214 can selectively energize solenoids of the valve control system 300 to maintain a depth of the various movable components of the implement 10 at an operator selected level, which can be selected using appropriate operator controls 228 within the operator cab of the tractor. The operator cab may also include various displays 230 to provide feedback regarding operation of the depth control system and other systems of the implement or tractor.

Figure 3:
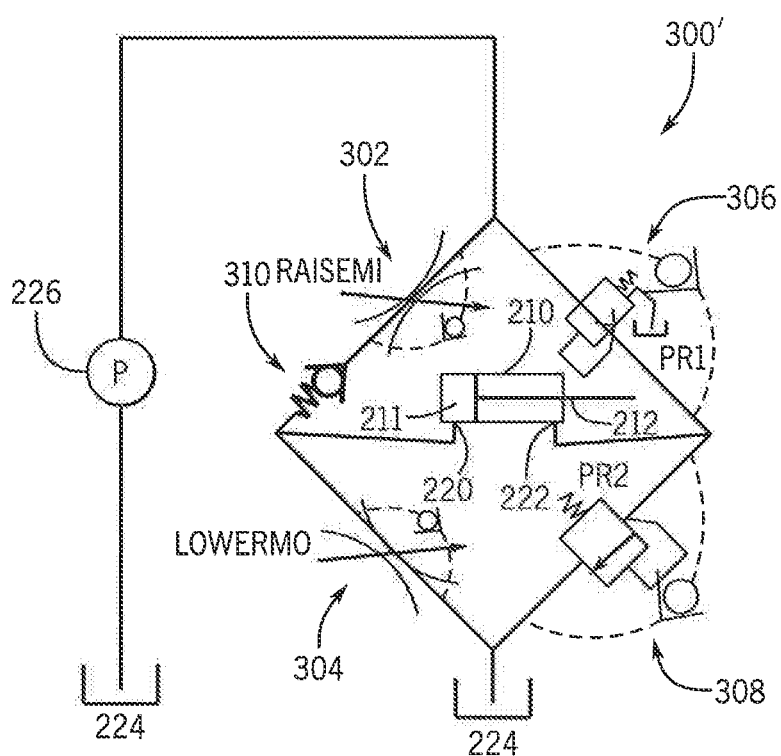
FIG. 3 is a schematic diagram of a valve control system which can be used in the depth control system of FIG. 2 according to a first aspect of the invention.

Referring now to FIG. 3, a schematic diagram of a first aspect of a valve control system 300' which could be used in the depth control system 206 is provided in accordance with an aspect of the invention. A first electronically controlled (electrohydraulic) proportional valve 302 with reverse check flow can be arranged between the pump 226 and the base port 220 of the hydraulic cylinder 210. The first proportional valve 302 can be selectively controlled by the controller 214 to proportionally meter hydraulic fluid from the pump 226 to the base port 220 during a raise operation (illustrated as "RaiseMI," or Raise Meter-In). In addition, a second electronically controlled (electrohydraulic) proportional valve 304 with reverse check flow can be arranged between the base port 220 of the hydraulic cylinder 210 and the fluid reservoir 224. The second proportional valve 304 can be selectively controlled by the controller 214 to proportionally meter hydraulic fluid from the base port 220 to the fluid reservoir 224 during a lower operation (illustrated as "LowerMO," or Lower Meter-Out).

However, instead of using additional electronically controlled proportional valves on the rod side, simplified first and second pressure regulators 306 and 308, respectively, such as poppet valves, with reverse check flow devices, can be used. In particular, the first pressure regulator 306 (illustrated as "Pr1," or Pressure Regulator 1) can be arranged between the pump 226 and the rod port 222 of the hydraulic cylinder 210. The first pressure regulator 306 does not require controlled operation, but rather can be configured to continuously regulate hydraulic fluid from the pump 226 to the rod port 222 at a constant pressure. Due to heavy load from the implement, there does not need to be much rod side pressure. However, it is still advantageous to provide some minimum pressure to push down the rod during a lower operation and/or reduce the possibility of cavitation on the rod-side during a lower operation. The first pressure regulator 306 could produce a constant pressure, for example, of about 300 psi, and more preferably, 500 psi. Accordingly, the first pressure regulator 306 can replace an electronically controlled proportional valve which might normally be present between the pump 226 and the rod port 222 used during a lower operation (i.e., LowerMI, or Lower Meter-In).

Also, the second pressure regulator 308 (illustrated as "Pr2," or Pressure Regulator 2) can be arranged between the rod port 222 and the fluid reservoir 224 of the hydraulic cylinder 210. The second pressure regulator 308 does not require controlled operation, but rather can be configured to continuously regulate hydraulic fluid from the rod port 222 at a constant pressure. Preferably, the pressure regulated by the first pressure regulator 306 is less than the pressure regulated by the second pressure regulator 308 so that flow through the first pressure regulator 306 is cut off during an operation requiring the second pressure regulator 308, such as raise operation. The second pressure regulator 308 could produce a constant pressure, for example, of at least 200 psi more than the first pressure regulator 306, such as 700 psi. Accordingly, the second pressure regulator 308 can replace an electronically controlled proportional valve which might normally be present between the rod port 222 and the fluid reservoir 224 used during a raise operation (i.e., RaiseMO, or Raise Meter-Out).

In operation, the controller 214 can executes a program stored in a non-transient medium 215 to raise or lower a work unit corresponding to the cylinder 210 by selectively controlling the first and second proportional valves 302 and 304, respectively. For example, to raise the work unit, the controller 214 can execute to control the first proportional valve 302 to proportionally meter hydraulic fluid to the base port by a desired amount corresponding to a depth selected by the operator, with feedback from the sensor 213, while the second control valve 304 is controlled to remain off. Meanwhile, the second pressure regulator 308, without requiring electronic control, will direct hydraulic fluid from the rod port 222 to the fluid reservoir 224. Conversely, to lower the work unit, the controller 214 can execute to control the second proportional valves 304 to proportionally meter hydraulic fluid out of the base port by a desired amount corresponding to a depth selected by the operator, with feedback from the sensor 213, while the first control valve 306 is controlled to remain off. Meanwhile, the first pressure regulator 306, without requiring electronic control, will direct hydraulic fluid from the pump 226 to the rod port 222.

In addition, a reverse check valve 310 can be arranged between the first proportional valve 302 and the base port 220 of the hydraulic cylinder 210. The reverse check valve 310 can prevent hydraulic flow from circling back during heavy load conditions, also known as a "runaway condition."

Accordingly, with the valve control system 300', when power is on, but the lift/lower system locks up, the rod side of the cylinder 210 can advantageously be maintained at a pressure of about 500 to 700 psi for more robust control. Also, when raising the work unit, the first pressure regulator 306 can be automatically closed, with pressure at the rod side of the cylinder 210 being maintained at about 700 psi. Also, when lowering the work unit, pressure at the rod side of the cylinder 210 can be 500 psi or less, depending on the speed at which the work unit is lowered. In lowering the work unit, the relief valve is closed. However, if the speed at which the work unit is lowered is too great, such that the rod side of the cylinder 210 is approaching cavitation, if supply flow is deficient, a reverse check flow device of the second pressure regulator 308 can open to fill hydraulic fluid from the fluid reservoir 224. Also, when power is off, such as for maintenance of the system, a reverse check flow device of the first pressure regulator 306 can open to release pressure trapped in the system.

Figure 4:
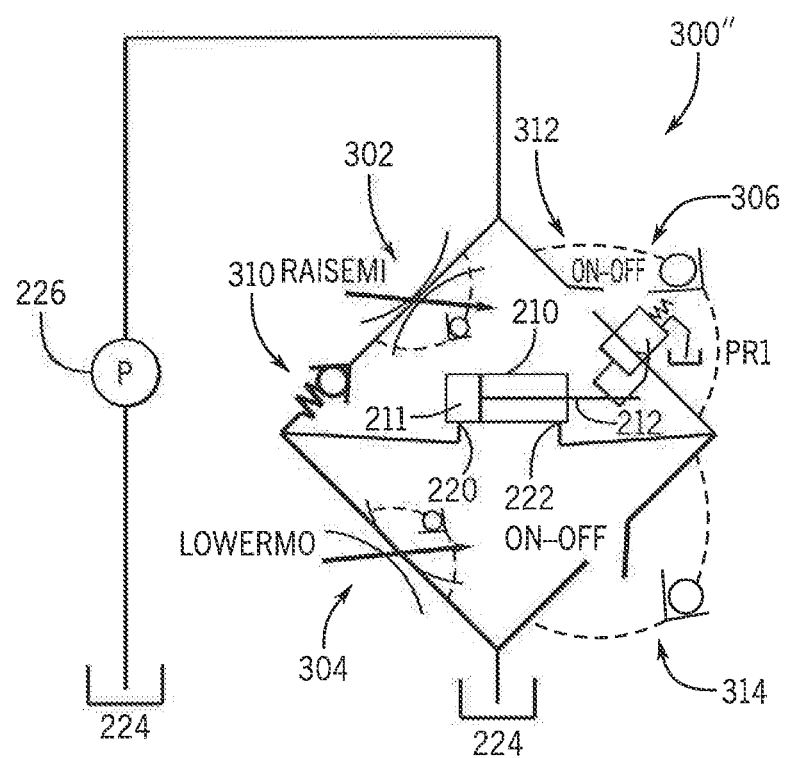
FIG. 4 is a schematic diagram of an alternative valve control system which can be used in the depth control system of FIG. 2 according to a second aspect of the invention.

Referring now to FIG. 4, where like numerals refer to like parts throughout, a schematic diagram of a second aspect of a valve control system 300" which could be used in the depth control system 206 is provided in accordance with an aspect of the invention. In this aspect, a first electronically controlled on-off valve 312 can be arranged between the pump 226 and the first pressure regulator 306. An electronically controlled on-off valve essentially provides only two states of operation: a first state which stops the flow of hydraulic fluid; and a second state which allows the flow of hydraulic fluid. Accordingly, such on-off valves are typically less expensive than proportional control valves and are typically simpler to control. In addition, a second electronically controlled on-off valve 314 with a reverse check flow device can be arranged between the rod port 222 of the cylinder 210 and the fluid reservoir 224.

The first and second electronically controlled on-off valves 312 and 314, respectively, can be controlled by the controller 214 to with the first and second proportional valves 302 and 304, respectively, to coordinate raise and lower operations. For example, to raise the work unit, the controller 214 can execute to control the first proportional valve 302 to proportionally meter hydraulic fluid to the base port by a desired amount corresponding to a depth selected by the operator, with feedback from the sensor 213, while the second electronically controlled on-off valve 314 is turned on. Meanwhile, the second control valve 304 and the first electronically controlled on-off valve 312 are controlled to remain off. Conversely, to lower the work unit, the controller 214 can execute to control the second proportional valve 304 to proportionally meter hydraulic fluid from the base port by a desired amount corresponding to a depth selected by the operator, with feedback from the sensor 213, while the first electronically controlled on-off valve 312 is turned on. Meanwhile, the first proportional valve 302 and the second electronically controlled on-off valve 314 are controlled to remain off.

Accordingly, with the valve control system 300", when power is on, but the lift/lower system locks up, the first and second on-off valves 312 and 314, respectively, can essentially provide a cut off. Also, when raising the work unit, the first on-off valve 312 can be cut-off, with the second on-off valve 314 providing hydraulic flow to the fluid reservoir 224. When lowering the work unit, the first on-off valve 312 can be on. Pressure at the rod side of the cylinder 210 can be 500 psi or less, depending on the speed at which the work unit is lowered. The second on-off valve 314 can be off. If the speed at which the work unit is lowered is too great, such that the rod side of the cylinder 210 is approaching cavitation, a reverse check flow device of the second pressure regulator 308 can open to fill hydraulic fluid from the fluid reservoir 224. Also, when power is off, such as for maintenance of the system, a reverse check flow device of the first pressure regulator 306 can open to release pressure trapped in the system.

Figure 5:
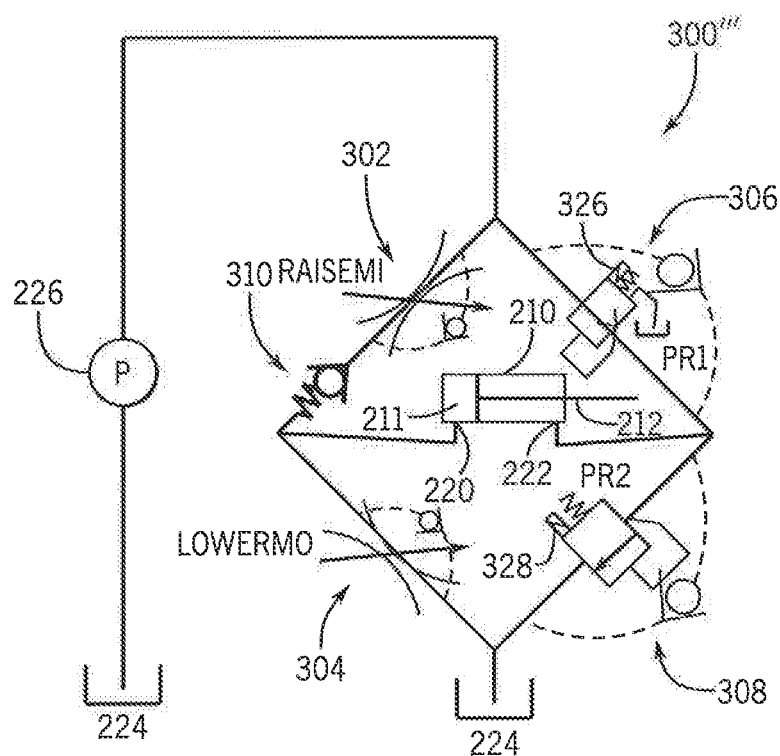
FIG. 5 is a schematic diagram of another alternative valve control system which can be used in the depth control system of FIG. 2 according to a third aspect of the invention.

Referring now to FIG. 5, where like numerals refer to like parts throughout, a schematic diagram of a third aspect of a valve control system 300''' which could be used in the depth control system 206 is provided in accordance with an aspect of the invention. In particular, in order to further improve performance, the first and/or second pressure regulators 306 and 308, respectively, can be electronically controlled to adjust the constant pressures produced by each. For example, electronic interfaces 326 and 328 of the first and second pressure regulators 306 and 308, respectively, can be in communication with the controller 214 for adjusting the pressures produced by each regulator.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A system for raising and lowering a work unit of an agricultural implement, comprising:
a pump configured to supply hydraulic fluid;
a hydraulic cylinder having a base, a base port, a rod and a rod port, the rod being configured to extend from the base when hydraulic fluid is supplied to the base port and withdrawn from the rod port, and the rod being configured to retract toward the base when hydraulic fluid is supplied to the rod port and withdrawn from the base port;
a first electronically controlled proportional valve arranged between the pump and the base port of the hydraulic cylinder, the first electronically controlled proportional valve being selectively controlled to proportionally meter hydraulic fluid from the pump to the base port;
a second electronically controlled proportional valve arranged between the base port of the hydraulic cylinder and a reservoir, the second electronically controlled proportional valve being selectively controlled to proportionally meter hydraulic fluid from the base port to a reservoir;
a controller in communication with the first and second electronically controlled proportional valves, the controller executing a program stored in non-transient medium to raise and lower a work unit of an agricultural implement by selectively controlling the first and second electronically controlled proportional valves to proportionally meter hydraulic fluid from the pump to the base port and proportionally meter hydraulic fluid from the base port to the reservoir, respectively;
a first pressure regulator arranged between the pump and the rod port of the hydraulic cylinder, the first pressure regulator being configured to continually regulate the hydraulic fluid to the rod port at a constant pressure; and
a second pressure regulator arranged between the rod port of the hydraulic cylinder and the reservoir, the second pressure regulator being configured to continually regulate the hydraulic fluid from the rod port at a constant pressure.

2. The system of claim 1, wherein the constant pressure at which the first pressure regulator is configured to continually regulate the hydraulic fluid differs from the constant pressure at which the second pressure regulator is configured to continually regulate hydraulic fluid.

3. The system of claim 2, wherein the constant pressure at which the first pressure regulator is configured to continually regulate the hydraulic fluid is less than the constant pressure at which the second pressure regulator is configured to continually regulate the hydraulic fluid.

4. The system of claim 1, wherein the pump is configured to supply hydraulic fluid at a pressure of at least 3000 psi (pounds per square inch), and wherein the first pressure regulator is configured to regulate the hydraulic fluid to a constant pressure of at least 300 psi.

5. The system of claim 4, wherein the constant pressure at which the first pressure regulator is configured to continually regulate the hydraulic fluid is less than the constant pressure at which the second pressure regulator is configured to continually regulate the hydraulic fluid, and wherein the second pressure regulator is configured to regulate the hydraulic fluid to a constant pressure of at least 500 psi.

6. The system of claim 1, further comprising a reverse check valve arranged between the first electronically controlled proportional valve and the base port of the hydraulic cylinder to prevent flow of hydraulic fluid from the hydraulic cylinder to the pump.

7. The system of claim 1, further comprising a sensor integrated with respect to the hydraulic cylinder, the sensor being in communication with the controller, wherein the sensor provides a signal to the controller indicating a linear displacement of the hydraulic cylinder.

8. The system of claim 1, further comprising an electronically controlled on-off valve arranged between the pump and the first pressure regulator.

9. The system of claim 8, wherein the electronically controlled on-off valve is a first electronically controlled on-off valve, and further comprising a second electronically controlled on-off valve arranged between the rod port of the hydraulic cylinder and the reservoir.

10. The system of claim 1, wherein the first pressure regulator is electronically controlled to adjust the constant pressure.

11. The system of claim 10, wherein the second pressure regulator is electronically controlled to adjust the constant pressure.

12. The system of claim 11, wherein the controller executes to configure the constant pressure regulated by the first pressure regulator to differ from the constant pressure regulated by the second pressure regulator.

13. The system of claim 12, wherein the controller executes to configure the constant pressure regulated by the first pressure regulator to be less than the constant pressure regulated by the second pressure regulator.

14. An agricultural system comprising:
an agricultural implement having a work unit;
a hydraulic cylinder configured to raise and lower the work unit, the hydraulic cylinder having a base, a base port, a rod and a rod port, the rod being configured to extend from the base when hydraulic fluid is supplied to the base port and withdrawn from the rod port, and the rod being configured to retract toward the base when hydraulic fluid is supplied to the rod port and withdrawn from the base port;
a pump configured to supply hydraulic fluid;
a first electronically controlled proportional valve arranged between the pump and the base port of the hydraulic cylinder, the first electronically controlled proportional valve being selectively controlled to proportionally meter hydraulic fluid from the pump to the base port;
a second electronically controlled proportional valve arranged between the base port of the hydraulic cylinder and a reservoir, the second electronically controlled proportional valve being selectively controlled to proportionally meter hydraulic fluid from the base port to a reservoir;
a controller in communication with the first and second electronically controlled proportional valves, the controller executing a program stored in a non-transient medium to raise and lower the work unit of the agricultural implement by selectively controlling the first and second electronically controlled proportional valves to proportionally meter hydraulic fluid from the pump to the base port and proportionally meter hydraulic fluid from the base port to the reservoir, respectively;
a first pressure regulator arranged between the pump and the rod port of the hydraulic cylinder, the first pressure regulator being configured to regulate the hydraulic fluid to the rod port at a first constant pressure;
and a second pressure regulator arranged between the rod port of the hydraulic cylinder and the reservoir, the second pressure regulator being configured to continually regulate the hydraulic fluid from the rod port at a second constant pressure.

15. The system of claim 14, wherein the first and second pressure regulators are controlled to adjust the first and second constant pressures, respectively.

16. The system of claim 14, further comprising an electronically controlled on-off valve arranged between the pump and the pressure regulator.

* * * * *